United States Patent [19]

Takeuchi et al.

[11] 4,218,261

[45] Aug. 19, 1980

[54] RETARDER FOR GYPSUM PLASTER AND A PROCESS FOR RETARDING THE SETTING OF GYPSUM PLASTER BY THE USE THEREOF

[75] Inventors: Koji Takeuchi, Yokohama; Takashi Zama; Shizuo Iwai, both of Kawasaki, all of Japan

[73] Assignee: Ajinomoto Company, Incorporated, Tokyo, Japan

[21] Appl. No.: 41,558

[22] Filed: May 23, 1979

[30] Foreign Application Priority Data

Jun. 1, 1978 [JP] Japan ................................ 53-66179

[51] Int. Cl.$^2$ ...................... C04B 11/14; C04B 11/22
[52] U.S. Cl. .................................. 106/111; 106/114; 106/315
[58] Field of Search ............... 106/109, 110, 111, 114, 106/315; 423/555

[56] References Cited

U.S. PATENT DOCUMENTS

| | | | |
|---|---|---|---|
| 2,448,218 | 8/1948 | Haddon | 106/111 |
| 2,607,427 | 8/1952 | Bond et al. | 106/114 |
| 3,215,549 | 11/1965 | Ericson | 106/111 |
| 3,451,832 | 6/1969 | Kuntze | 106/111 |
| 3,598,621 | 8/1971 | Ferrara | 106/111 |
| 3,656,985 | 4/1972 | Bonnel et al. | 106/315 |

*Primary Examiner*—O. R. Vertiz
*Assistant Examiner*—Gary R. Straub
*Attorney, Agent, or Firm*—Oblon, Fisher, Spivak, McClelland & Maier

[57] ABSTRACT

A retarder for gypsum plaster is provided which consists essentially of $\beta$-hydroxy-$\beta$-carboxy-isocaproic acid or a water soluble salt thereof. It has powerful retarding effect toward gypsum plaster and gives a solid product having much better mechanical strength than that encountered when an alkali metal salt of citric acid or powdered glue which are the ordinary set retarders are used. A process for retarding the setting of gypsum plaster by the use thereof, is also provided.

5 Claims, No Drawings

RETARDER FOR GYPSUM PLASTER AND A PROCESS FOR RETARDING THE SETTING OF GYPSUM PLASTER BY THE USE THEREOF

BACKGROUND OF THE INVENTION

The present invention relates to a retarder for gypsum plaster and a process for retarding the setting of gypsum plaster by the use thereof.

Gypsum is widely utilized as construction materials such as gypsum board, fiber-gypsum board which is the hardened mixture product of gypsum and fiber (e.g. asbestos, rockfiber, glass wool, natural animal and vegetable fiber, or synthetic fiber), fire-proof spraying material which is a mixture of gypsum and fiber, gypsum plaster for covering a house wall and floor material (gypsum mortar) and as pottery molding plaster.

In case where gypsum is utilized in the above construction materials by setting, generally the setting velocity of gypsum is greater than the production velocity of the construction materials and hence an aqueous gypsum slurry or paste solidifies during production process of the construction materials in the container or in the pipe for transportation to cause the occurrence of working trouble and the loss of the raw material employed. Also, during molding process, said slurry or paste does not solidify uniformly, which results in the formation of non-uniform product.

Then, in order to avoid such troubles, there have been incorporated in gypsum as set retarders alkali metal salt of citric acid such as sodium salt and glue powder which is a hydrolyzed product of animal proteins, whereby the setting time may be delayed. However, satisfactory retarding effect may be attained only by addition of a large amount of such retarders. Furthermore, the addition of such retarders generally decreases the mechanical strength of the hardened product to a considerable degree. Especially, the use of sodium citrate causes marked decrease of mechanical strength. Also, since sodium citrate retards the setting of gypsum with certain limitation, no longer retarding effect can be attained even by increasing the amount added.

On the other hand, as to the hydrolyzed product of animal proteins, stock-raising animal is mainly employed as raw material and obnoxious odour is evolved during its hydrolysis, and causes problems of labor sanitation and environmental pollution. Furthermore, there is involved problem of security of raw material and reproducibility of retarding property of product.

SUMMARY OF THE INVENTION

It is an object of the present invention to provide gypsum plaster composition containing a new type of retarder which has no faults such as encountered in the prior art.

It has now been found that $\beta$-hydroxy-$\beta$-carboxy-isocaproic acid and water soluble salts thereof are excellent set retarders because satisfactory retarding result may be obtained even when they are incorporated in the gypsum plaster in smaller amount than the most widely used set retarders such as sodium citrate and powdery glue and because they give a solid product having much less adverse effect on mechanical strength than that encountered when the ordinary retarders are used.

DESCRIPTION OF THE PREFERRED EMBODIMENTS $\beta$-Hydroxy-$\beta$-carboxy-isocaproic acid for use as retarder in the present invention may be obtained cheaply and in large amount e.g. by culturing aerobically a microorganism of the genus Brevibacterium or Corynebacterium which is capable of producing $\beta$-hydroxy-$\beta$-carboxy-isocaproic acid in an aqueous culture medium at a pH ranging from 4 to 8 and at a temperature ranging from 25° C. to 38° C. during a typical growth period of 1 to 7 days.

As water soluble salts of $\beta$-hydroxy-$\beta$-carboxy-isocaproic acid, alkali metal salts such as sodium and potassium salts, and ammonium salt may be preferably employed.

Gypsum to be used in the present invention is not restricted to specific one. Any type of gypsum may be used if it causes difficulty in working procedure owing to the fact that its setting velocity is greater than working velocity of product. Usually, $\alpha$- or $\beta$-type of gypsum hemihydrate and those containing anhydrous gypsum or calcium sulfate dihydrate as impurity may be preferably applied.

As to the amount added of the retarder of the present invention with respect to gypsum, it may be easily experimentally determined so as to obtain the desired setting time. However, the retarder of the present invention may be incorporated in an amount of from about 0.01 to about 5 parts by weight per 100 parts by weight of gypsum hemihydrate for ordinary purposes. If desired, it may be employed in admixture with other retarders.

The following example illustrates the present invention but the invention is not limited thereto.

In the example, commercial $\beta$-type of gypsum was employed as gypsum hemihydrate for measurement of setting time. The measurements of mixing water amount and of setting time were conducted according to the physical test method of pottery molding plaster defined by Japanese Industrial Standards R-9112. At the same time, there were prepared test specimens of $2 \times 4 \times 16$ cm and their mechanical strengths were measured with a bending strength test machine.

REFERENTIAL EXAMPLE

Preparation of $\beta$-hydroxy-$\beta$-carboxy-isocaproic acid

An aqueous culture medium was prepared to contain 10 g/dl glucose, 1.5 g/dl ammonium sulfate, 0.1 g/dl KH$_2$PO$_4$, 0.04 g/dl MgSO$_4$.7H$_2$O, 0.001 g/dl MnSO$_4$.4H$_2$O, 250 µg/l biotin, 200 µg/l thiamine.HCl, 1.5 ml/dl soybean protein hydrolyzate (containing 6.5 g total nitrogen/dl) and 5 g/dl CaCO$_3$ (separately sterilized) and adjusted to pH 7.0 with KOH. Twenty ml batches of the aqueous culture medium were placed in 500 ml shaking flasks and heated at 110° C. for 10 minutes with steam.

A loopful inoculum of the microorganism Brevibacterium flavum AJ 11229, FERM-P 4396 (NRRL B-11425) which had been previously cultured on a glucose-bouillon agar slant was inoculated in the aqueous medium, and cultivation was carried out at 31.5° C. for 96 hours with shaking.

One liter of the culture liquid was passed through a column packed with an anionic exchange resin IRA-93 and thereafter 1 l of water was passed through the column and the column was back washed with 2 l of water.

And then, 3 l of 1N hydrochloric acid was passed through the column to elute β-hydroxy-β-carboxy-isocaproic acid. The eluate was concentrated under reduced pressure to obtain 5 g of crystalline β-hydroxy-β-carboxy-isocaproic acid. M.P. 167~170° C.

EXAMPLE

Each of (1) β-hydroxy-β-carboxy-isocaproic acid (2) ammonium salt thereof (m.p. 122~125° C.) and (3) sodium salt thereof (m.p. 318~323° C.) was added in proportions as shown in Table 1 to commercial β-type of gypsum hemihydrate.

The setting time of the respective gypsum plasters obtained was measured according to Japanese Industrial Standards R-9112. Also, bending strength test was carried out with respect to the specimens. The results obtained are summarized in Table 1 which also shows the results obtained when similar tests were conducted with respect to gypsum plaster compositions containing sodium citrate, potassium citrate or powdered glue for purposes of comparison.

Table 1

|  | Retarder | Amount of retarder (wt % based on gypsum) | Time of set (hrs.-min.) | Bending strength (Kg/cm$^2$) |
| --- | --- | --- | --- | --- |
|  | None | 0 | 0–50 | 55 |
|  |  | 0.03 | 3–30 | 53 |
|  | (1) | 0.05 | 5–45 | 50 |
|  |  | 0.1 | 8–10 | 48 |
| The |  | 0.05 | 5–17 | 51 |
| present | (2) | 0.1 | 7–50 | 48 |
| invention |  | 0.15 | 9–50 | 44 |
|  |  | 0.05 | 5–00 | 50 |
|  | (3) | 0.1 | 7–40 | 47 |
|  |  | 0.15 | 10–00 | 42 |
|  |  | 0.05 | 3–20 | 45 |
|  | Sodium citrate | 0.1 | 5–03 | 37 |
|  |  | 0.15 | 6–13 | 30 |

Table 1-continued

|  | Retarder | Amount of retarder (wt % based on gypsum) | Time of set (hrs.-min.) | Bending strength (Kg/cm$^2$) |
| --- | --- | --- | --- | --- |
|  |  | 0.05 | 3–00 | 46 |
| Control | Potassium citrate | 0.1 | 4–10 | 39 |
|  |  | 0.15 | 4–50 | 35 |
|  |  | 0.05 | 2–03 | 48 |
|  | Powdery glue | 0.1 | 3–13 | 46 |
|  |  | 0.15 | 4–44 | 38 |

From the above Table 1, it may readily be seen that β-hydroxy-β-carboxy-isocaproic acid and its ammonium and sodium salts have 1.5 times the retarding effect of sodium citrate and 2 times the retarding effect of powdered glue and potassium citrate. Also, the retarders of the present invention give a product having bending strength greater than that encountered when ordinary retarders are used.

What we claim is:

1. A plaster composition comprising gypsum plaster and, as a retarder for retarding the setting thereof, β-hydroxy-β-carboxy-isocaproic acid or a water soluble salt thereof.

2. A plaster composition according to claim 1, wherein said water soluble salt is an alkali metal or ammonium salt.

3. A plaster composition according to claim 1, wherein β-hydroxyβ-carboxy-isocaprioic acid or a water soluble salt thereof is present in an amount of from about 0.01 to about 5 parts by weight per 100 parts by weight of gypsum hemihydrate.

4. A process for retarding the setting of a gypsum plaster composition which comprises incorporating in said gypsum plaster composition an effective amount of a retarder selected from the group consisting of β-hydroxy-β-carboxy-isocaproic acid and a water soluble salt thereof.

5. A process according to claim 4, wherein said retarder is incorporated in an amount of from about 0.01 to about 5 parts by weight per 100 parts by weight of gypsum hemihydrate.

* * * * *